(12) United States Patent
Frenzel et al.

(10) Patent No.: US 11,518,358 B2
(45) Date of Patent: Dec. 6, 2022

(54) METHOD AND DEVICE FOR A HIGHLY AVAILABLE AUTOMATIC PARKING BRAKE

(71) Applicant: Robert Bosch GmbH, Stuttgart (DE)

(72) Inventors: Toni Frenzel, Heilbronn (DE); Bernd Stoehr, Sachsenheim (DE); Steffen Zechmeister, Bad Wimpfen (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 16/210,211

(22) Filed: Dec. 5, 2018

(65) Prior Publication Data

US 2019/0176789 A1    Jun. 13, 2019

(30) Foreign Application Priority Data

Dec. 12, 2017    (DE) ..................... 10 2017 222 484.3

(51) Int. Cl.
 *B60T 13/74*    (2006.01)
(52) U.S. Cl.
 CPC ....... *B60T 13/745* (2013.01); *B60T 2270/402* (2013.01)
(58) Field of Classification Search
 CPC ......... G05B 19/0428; G05B 9/03; B60T 7/12; B60T 13/588; B60T 13/741; B60T 13/745; B60T 13/746; B60T 13/748; B60T 17/221; B60T 7/042; B60T 7/045; B60T 7/107; B60T 2270/413; B60T 2270/402
 See application file for complete search history.

(56) References Cited

U.S. PATENT DOCUMENTS

| 4,546,437 A * | 10/1985 | Bleckmann | B60T 8/885 303/122.05 |
| 2008/0258253 A1* | 10/2008 | Fey | G05B 9/03 257/500 |
| 2013/0282249 A1* | 10/2013 | Heise | B60T 7/042 701/70 |

FOREIGN PATENT DOCUMENTS

| DE | 10 2007 029 910 A1 | 9/2008 |
| DE | 10 2011 084 534 A1 | 4/2012 |
| DE | 10 2012 010 562 A1 | 11/2013 |
| WO | 00/29268 A1 | 5/2000 |

* cited by examiner

*Primary Examiner* — Faris S Almatrahi
*Assistant Examiner* — Andrew J Cromer
(74) *Attorney, Agent, or Firm* — Maginot, Moore & Beck LLP

(57) ABSTRACT

A device for an automatic parking brake includes a first microchip and a second microchip. The first microchip and the second microchip are configured to actuate an end stage of the automatic parking brake. The first microchip and the second microchip are configured in a redundant manner with respect to one another in relation to actuating the end stage.

10 Claims, 2 Drawing Sheets

METHOD AND DEVICE FOR A HIGHLY AVAILABLE AUTOMATIC PARKING BRAKE

This application claims priority under 35 U.S.C. § 119 to patent application no. DE 102017222484.3 filed on Dec. 12, 2017 in Germany, the disclosure of which is incorporated herein by reference in its entirety.

The disclosure relates to a method and device a highly available automatic parking brake.

BACKGROUND

An automatic parking brake is used in a vehicle in order to replace a holding brake for safely parking the vehicle. The automatic parking brake is generally embodied respectively from one electric motor per wheel of the rear axle of a vehicle, a button as an operating element in the vehicle interior compartment and a control device, ECU. The motor is used in this case to close and open the parking brake, wherein the driver initiates this procedure in general via the button. In this case, in the case of an integrated parking brake the control device, for example an ESP control device, evaluates a state of the button and subsequently controls the motors of the automatic parking brake.

The automatic parking brake in the case of conventional vehicles having an internal combustion engine is one of two devices that are suitable for parking the vehicle. The second device is the gear lock (detent) or shifting into a gear in vehicles having a manual transmission.

As a consequence, it is ensured that in the event of a failure of the ESP control device or the automatic parking brake a redundant parking device is provided in order to safely park the vehicle.

Conventional transmission systems having detents are not provided in electric vehicles and therefore this parking device is omitted. Only the automatic parking brake is provided so as to secure the vehicle at a standstill. However, it may no longer be possible to actuate the automatic parking brake in the event of a failure in the ESP control device or of circuit components of the automatic parking brake. In this case, it is no longer possible to safely park the vehicle.

An automatic parking brake that is improved in this respect is therefore desirable.

SUMMARY

This is achieved by virtue of the device and the method and also the hydraulic or electromechanical brake system according to the disclosure.

The device for an automatic parking brake comprises a first microchip and a second microchip, wherein the first microchip and the second microchip are embodied so as to actuate an end stage of the automatic parking brake, wherein the first microchip and the second microchip are embodied in a redundant manner with respect to one another in relation to actuating the end stage. In the event of a failure, the capability of actuating the automatic brake is thus furthermore ensured. It is therefore ensured that it is possible to safely park electric vehicles without detents even in the event of a failure. A parking brake functionality remains highly available and is designed in a robust manner. The availability relates to single electrical faults. Single electrical faults may either occur in an ESP system that actuates the automatic parking brake when it is functioning correctly. Single electrical faults may also occur in one of the two microchips. In the event of a failure it is possible by means of the intelligence that is distributed to various circuit components to safely park the vehicle.

It is preferred that the first microchip and/or the second microchip is embodied as a user-specific integrated circuit ASIC or a logic gate arrangement that may be programmed in the field. This renders it possible to integrate the redundancy into a control device in a simple manner.

It is preferred that the first microchip and the second microchip are arranged in the same control device. This renders possible the arrangement in the same control device that actuates the automatic parking brake when it is functioning correctly.

It is preferred that the first microchip and the second microchip are arranged in different control devices. This increases the availability in the event of one of the control devices failing. This concept offers the possibility of distributing the two ASICs for the high availability to two control devices. An independence of a used E/E architecture is consequently ensured.

It is preferred that an interface for receiving information regarding a state of an operating element for the automatic parking brake is integrated into the first microchip and/or into the second microchip, wherein the first microchip and/or the second microchip is embodied so as to identify a failure and to actuate the end stage of the automatic parking brake depending upon the information regarding the state of the operating element in the event of a failure. As a consequence, an autarchic procedure for identifying a failure is possible independently of the function of the control device that actuates the automatic parking brake when said device is functioning correctly.

It is preferred that the first microchip and the second microchip are embodied so as to ascertain information regarding a movement state of a vehicle in which the automatic parking brake is integrated, and in the event of a failure to actuate the automatic parking brake depending upon the movement state. As a consequence, an autarchic identification of the movement state is possible independently of the function of the control device that actuates the automatic parking brake when said device is functioning correctly.

It is preferred that a control device for the automatic parking brake ascertains information regarding the movement state of the vehicle depending upon information regarding at least one wheel rotational speed of at least one wheel of the vehicle, wherein the first microchip and/or the second microchip is embodied so as to ascertain the movement state of the vehicle depending upon information regarding at least one other wheel rotational speed of at least one other wheel of the motor vehicle. As a consequence, it is also still possible to identify that the vehicle is at a standstill if the control device or one of the microchips fails.

In the method for the automatic parking brake, an end stage of the automatic parking brake is actuated by means of a first microchip, wherein the first microchip and a second microchip are embodied in a redundant manner with respect to one another in relation to actuating the end stage, wherein the second microchip actuates the end stage if a failure of the first microchip is identified. This method offers a concept in which a microchip offers a safety concept that includes a redundancy by means of the distribution of functions and by means of using two examples of the same microchip.

It is preferred that information regarding a state of an operating element for the automatic parking brake is received by means of an interface that is integrated into the first microchip and/or into the second microchip, wherein the first microchip and/or the second microchip identifies the failure and actuates the end stage of the automatic parking brake depending upon the information regarding the state of the operating element in the event of a failure. A state of a button, for example: neutral, apply, release, is ascertained via an interface that is entirely integrated into the microchip and consequently independently of other microcontrollers or control devices.

It is preferred that the first microchip and/or the second microchip ascertains information regarding a movement state of a vehicle in which the automatic parking brake is integrated, and in the event of a failure actuates the automatic parking brake depending upon the movement state. Therefore, the state where the vehicle is at a standstill is also identified in an autarchic manner in the event of a failure and the function of the automatic parking brake remains available in the event of a failure.

It is preferred that information regarding the movement state of the vehicle is ascertained by means of a control device for the automatic parking brake depending upon information regarding at least one wheel rotational speed of at least one wheel of the vehicle, wherein the first microchip and/or the second microchip ascertains the movement state of the vehicle depending upon information regarding at least one other wheel rotational speed of at least one other wheel of the motor vehicle. The availability of the procedure of identifying that the vehicle is at a standstill is therefore improved.

The hydraulic or electromechanical brake system in a vehicle having a device of this type may be used, by way of example, in an electric vehicle that does not comprise a detent.

BRIEF DESCRIPTION OF THE DRAWINGS

Further advantageous embodiments are apparent in the following description and the drawing.

In the drawing.

DETAILED DESCRIPTION

Figure 1:
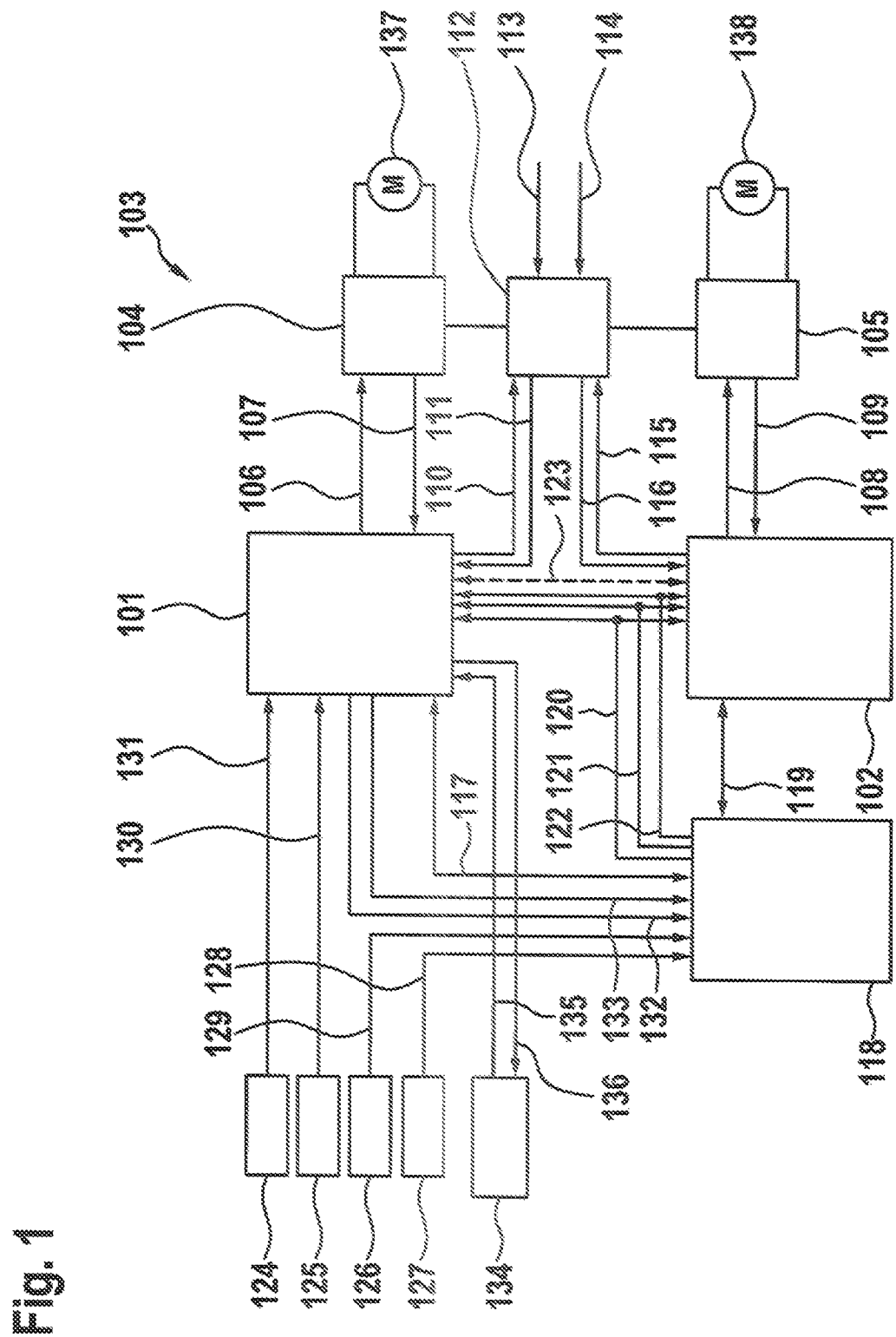
FIG. 1 illustrates schematically a part of a vehicle having an automatic parking brake.

FIG. 1 illustrates schematically a part of a vehicle having an automatic parking brake. More precisely, FIG. 1 illustrates the construction of a highly available parking brake within a control device in a block diagram plane. The highly available parking brake may also be realized in a modular manner, in other words may be distributed over multiple control devices.

The device that is described below for the automatic parking brake comprises a first microchip 101 and a second microchip 102. The first microchip 101 and the second microchip 102 are embodied as a user-specific integrated circuit, ASIC. In lieu of this, a logic gate arrangement that may be programmed in the field may also be used.

The first microchip 101 and the second microchip 102 are arranged in this example in the same control device. In lieu of this the first microchip 101 and the second microchip 102 may also be arranged in different control devices.

The first microchip 101 and the second microchip 102 are embodied so as to actuate an end stage 103 of the automatic parking brake. The first microchip 101 and the second microchip 102 are embodied in a redundant manner with respect to one another in relation to actuating the end stage 103.

The end stage 103 in the example comprises a first H-bridge 104 and a second H-bridge 105.

By way of example, two ASICs that are identical in construction are used. The actuation of the end stage 103 is divided into one side A and one side B. The first side A corresponds in the example to the first H-bridge 104 and the second side B corresponds to the second H-bridge 105. In this case, the first microchip 101 assumes the actuation 106 and the current and voltage measurement 107 of the side A whilst the second microchip 102 assumes the actuation 108 and the current and voltage measurement 109 of the side B.

The first microchip 101 comprises a first actuating line 110 and a first feedback line 111 to a voltage supply device 112 for connecting or feeding back a main supply voltage 113 and a redundant supply voltage 114 in order to ensure the voltage supply for the end stage 103. The second microchip 102 comprises a second actuating line 115 and a second feedback line 116 to the voltage supply device 112 for connecting or feeding back the main supply voltage 113 and the redundant supply voltage 114 in order to ensure the voltage supply for the end stage 103.

The first microchip 101 is connected via a first Bus 117, for example Serial Peripheral Interface, SPI, to a microcontroller and a system ASIC for the purposes of communication.

These components are illustrated schematically in FIG. 1 as a system 118. The second microchip 102 is connected via a second bus 119, for example SPI, to the system 118 that comprises the microcontroller and the system ASIC for the purposes of communication. The microcontroller coordinates and controls the actuation of the electric parking brake when functioning correctly.

The first microchip 101 and the second microchip 102 are embodied so as to ascertain information regarding a movement state of a vehicle in which the automatic parking brake is integrated and in the event of a failure to actuate the automatic parking brake depending upon the movement state.

The movement state is by way of example either that the vehicle is at a standstill or is travelling. Independently of whether the system 118 or the first microchip 101 or the second microchip 102 triggers the actuation of the end stage, the automatic parking brake in the example is only actuated if the state where the vehicle is at a standstill is identified, for example at a vehicle speed v<3 km/h so as to close the automatic parking brake.

In order to ascertain the movement state, in the example the control device for the automatic parking brake is embodied so as to ascertain information regarding the movement state of the vehicle depending upon information regarding at least one wheel rotational speed of at least one wheel of the vehicle. The first microchip 101 and/or the second microchip 102 are embodied in the example so as to ascertain the movement state of the vehicle depending upon information regarding at least one other wheel rotational speed of at least one other wheel of the motor vehicle.

Further signals are used in order to realise a safety concept and in order to be able to identify a failure of the system 118. By way of example, signals are exchanged via a first signal line 120, a second signal line 121 and a third signal line 122 between the system 118, the first microchip 101 and the second microchip 102. The signals are by way of example WAU, LS safety switch, EN_EL.

A communications structure 123 between the first microchip 101 and the second microchip 102 is optionally provided in order in the event of an emergency stop for automatic parking functions to still render it possible to release the automatic parking brake.

In order to be able to guarantee that the vehicle is at a standstill even in the event of a failure of the system 118 and/or either of the first microchip 101 or the second microchip 102, in the example two of altogether four wheel rotational speed sensors 124, 125, 126, 127 are input via the system 118.

By way of example, the wheel rotational speeds of the front wheels of the vehicle are input by the system 118 via a first connection 128 and a second connection 129.

By way of example, the wheel rotational speeds of the rear wheels are input via a third connection 130 and a fourth connection 131 by the first microchip 101. The wheel rotational speeds of the rear wheels are subsequently transmitted via a fifth connection 132 and a sixth connection 133 from the first microchip 101 to the system 118.

A state of an operating element 134 is input via an interface that is integrated into the first microchip 101 via an input line 135. An output line 136 is optionally provided with which a light source in the operating element 134 is actuated in order to optically display to a user whether the automatic parking brake is closed or not.

The operating element 134 is by way of example a button that may trigger the states: neutral, apply, release.

This part of the control device in the example is entirely independent of the system 118 and the second microchip 102. However, a redundancy may also be provided for this purpose.

More precisely, an interface for receiving information regarding the state of the operating element 134 for the automatic parking brake may be integrated into the first microchip 101 and/or into the second microchip 102.

Moreover, the first microchip 101 and/or the second microchip 102 is embodied so as to identify a failure and to actuate the end stage 103 of the automatic parking brake depending upon the information regarding the state of the operating element 103 in the event of a failure.

In the example, the first microchip 101 is embodied so as in the event of a failure to ascertain the operating state in which the vehicle is at a standstill and to ascertain the state "apply" of the operating element 103 and to actuate the first H-bridge 104 so as to close the automatic parking brake. Moreover, the first microchip 101 is embodied in the example so as to ascertain a state "release" in the event of a failure after closing the automatic parking brake and to actuate the first H-bridge so as to open the automatic parking brake.

A hydraulic brake system that comprises this device also comprises a first motor 137 that is actuated by the first H-bridge 104 in order to close the automatic parking brake. The hydraulic brake system in the example comprises a second motor 138 that is actuated by the second H-bridge 105 in order to close the automatic parking brake. These motors may be arranged on different wheels of the vehicle.

Figure 2:
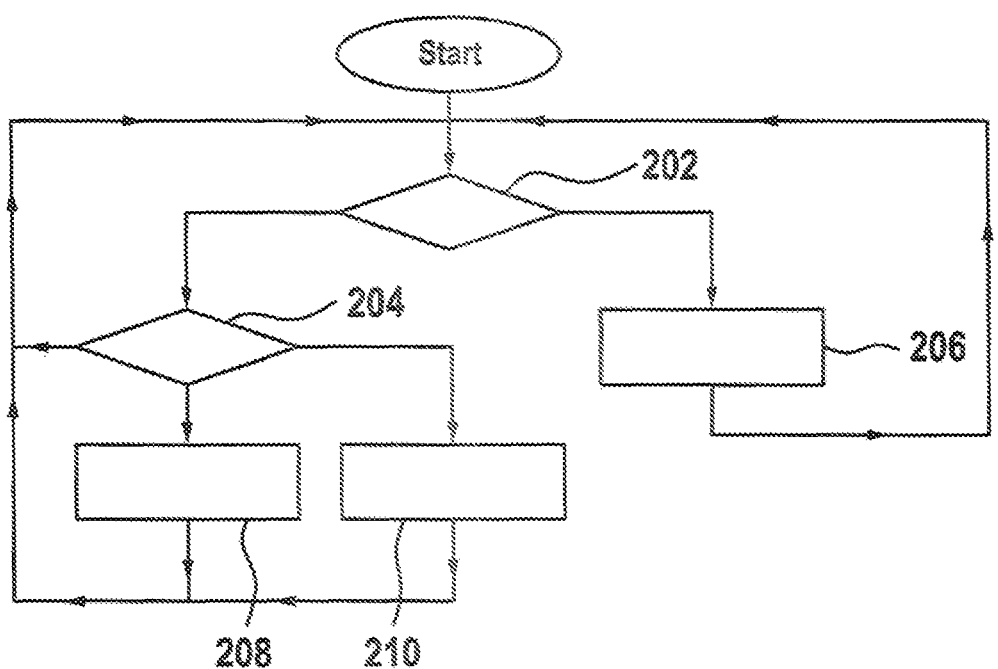
FIG. 2 illustrates schematically steps in a method for an automatic parking brake.

The hydraulic or electromechanical brake system is operated by way of example according to the following method. Steps of the method are illustrated schematically in FIG. 2.

After the start, in a step 202 a check is performed as to whether a failure has occurred. If a failure has occurred, a step 204 is performed, otherwise a step 206 is then performed.

Step 206 relates to the case where a failure has not occurred. The automatic parking brake is actuated by means of the control device. In the example, the first microchip 101 and the second microchip 102 are actuated by means of the system 118 in order to control the first H-bridge 104 and the second H-bridge 105.

The step 202 is subsequently performed.

Step 204 relates to the event of a failure occurring. In step 204 the state of the operating element 134 and the movement state of the vehicle is checked by the first microchip 101. In dependence upon said check, it is determined whether the automatic parking brake is to be closed, opened or to be left unchanged.

The state of the operating element 134 for the automatic parking brake is received by means of the interface that is integrated into the first microchip 101. The first microchip 101 ascertains information regarding the state of the operating element 134, in other words in the example: neutral, apply, release.

The first microchip 101 ascertains information regarding the movement state of the vehicle in which the automatic parking brake is integrated, in other words in the example the vehicle is at a standstill or is moving. The first microchip 101 ascertains the movement state of the vehicle, said movement state being ascertained in the example depending upon information regarding at least one wheel rotational speed of the rear wheels of the vehicle.

If the automatic parking brake is to be opened, a step 208 is performed. If the automatic parking brake is to be closed, the step 210 is performed. Otherwise, the step 202 is performed.

In step 208, the first H-bridge 104 is actuated by the first microchip 101 in order to open the automatic parking brake.

The step 202 is subsequently performed.

In step 210, the first H-bridge 104 is actuated by the first microchip 101 in order to close the automatic parking brake.

The step 202 is subsequently performed.

The first microchip 101 and the second microchip 102 are embodied in a redundant manner in the example. The end stage of the automatic parking brake is actuated in the event of a failure in the example by means of the first microchip 101 if said microchip is intact. If said microchip is not functional, the second microchip 102 actuates the end stage if a failure is identified in the first microchip 101. By way of example, this is also monitored in step 202 by the second microchip 102.

As a consequence, a highly available automatic parking brake is provided. It is particularly advantageous if in the technical embodiment ASICs are used which alone, in other words in an autarchic manner, fulfil a standard function for the actuation of the two H-bridges A and B including current and voltage measurement according to the norm VDA305-100 and do not offer a redundancy per se. The combination of two of these ASICs renders it possible by means of a suitable distribution of the functionality and the use of the optional communication between the two ASICs to illustrate the required redundancy and intelligence in order to represent an automatic parking brake functionality having the corresponding safety concept in the event of a failure of the microcontroller of the system 118, including identifying that the vehicle is at a standstill and evaluating the button of the automatic parking brake.

What is claimed is:

1. A device for an automatic parking brake, comprising:
   a first microchip; and
   a second microchip,
   wherein the first microchip and the second microchip are:
      configured to actuate an end stage of the automatic parking brake, and configured in a redundant manner with respect to one another in relation to actuating the end stage, and further comprising:
    a control system configured to determine the movement state of the vehicle based on a wheel rotational speed of a wheel of the vehicle and to actuate the automatic parking brake based on the movement state,
wherein the first microchip and/or the second microchip is further configured to determine the movement state of the vehicle based on another wheel rotational speed of another wheel of the vehicle independently from the determination of the movement state of the vehicle by the control system, and
wherein the first microchip and/or the second microchip is configured to identify a failure of the control system and to actuate the end stage of the automatic parking brake based on the determined movement state when the failure of the control system is identified.

2. The device according to claim 1, wherein the first microchip and/or the second microchip is further configured as a user-specific integrated circuit or a logic gate arrangement configured to be programmed in a field.

3. The device according to claim 1, wherein:
the first microchip is arranged in a control device; and
the second microchip is arranged in the control device.

4. The device according to claim 1, wherein the first microchip and the second microchip are arranged in different control devices.

5. The device according to claim 1, further comprising:
an interface configured to receive information regarding a state of an operating element for the automatic parking brake, the interface integrated into the first microchip and/or into the second microchip,
wherein the first microchip and/or the second microchip is further configured to:
    identify a failure, and
    actuate the end stage of the automatic parking brake based on the state of the operating element when the failure is identified.

6. A method for operating an automatic parking brake, comprising:
actuating an end stage of the automatic parking brake using a first microchip; and
actuating the end stage using a second microchip when a failure of the first microchip is identified,
wherein the first microchip and the second microchip are configured in a redundant manner with respect to one another in relation to the actuation of the end stage, and
further comprising:
    determining a movement state of the vehicle using a control system for the automatic parking brake based on a wheel rotational speed of a wheel of the vehicle, the control system being configured to actuate the automatic parking brake based on the determined movement state;
    determining the movement state of the vehicle using the first microchip and/or the second microchip based on another wheel rotational speed of another wheel of the vehicle independently from the determination of the movement state of the vehicle by the control system, and
    identifying a failure of the control system using the first microchip and/or the second microchip; and
    actuating the end stage of the automatic parking brake using the first microchip and/or the second microchip based on the determined movement state when the failure of the control system is identified.

7. The method according to claim 6, further comprising:
receiving information regarding a state of an operating element for the automatic parking brake using an interface integrated into the first microchip and/or the second microchip;
identifying the failure using the first microchip and/or the second microchip; and
actuating the end stage of the automatic parking brake based on the state of the operating element in event of the identified failure.

8. The method according to claim 6, further comprising:
determining the movement state of a vehicle in which the automatic parking brake is integrated using the first microchip and/or the second microchip; and
actuating the automatic parking brake based on the determined movement state in an event of the failure.

9. A brake system in a vehicle, comprising:
an automatic parking brake;
a device operably connected to the automatic parking brake including:
    a first microchip; and
    a second microchip,
    wherein the first microchip and the second microchip are:
        configured to actuate an end stage of the automatic parking brake, and
        configured in a redundant manner with respect to one another in relation to actuating the end stage, and
further comprising:
    a control system configured to determine the movement state of the vehicle based on a wheel rotational speed of a wheel of the vehicle and to actuate the automatic parking brake based on the movement state,
wherein the first microchip and/or the second microchip is further configured to determine the movement state of the vehicle based on another wheel rotational speed of another wheel of the vehicle independently from the determination of the movement state of the vehicle by the control system, and
wherein the first microchip and/or the second microchip is configured to identify a failure of the control system and to actuate the end stage of the automatic parking brake based on the determined movement state when the failure of the control system is identified.

10. The brake system according to claim 9, wherein the brake system is hydraulic or electromechanical.

* * * * *